(12) United States Patent
Niimi et al.

(10) Patent No.: US 8,823,305 B2
(45) Date of Patent: Sep. 2, 2014

(54) ELECTRIC POWER STEERING SYSTEM

(75) Inventors: Kozo Niimi, Kariya (JP); Yuji Kariatsumari, Yamatotakada (JP)

(73) Assignee: JTEKT Corporation, Osaka (JP)

( * ) Notice: Subject to any disclaimer, the term of this patent is extended or adjusted under 35 U.S.C. 154(b) by 110 days.

(21) Appl. No.: 13/476,398

(22) Filed: May 21, 2012

(65) Prior Publication Data

US 2012/0299517 A1 Nov. 29, 2012

(30) Foreign Application Priority Data

May 25, 2011 (JP) ................................ 2011-116949

(51) Int. Cl.
*H02P 7/00* (2006.01)
*B62D 5/04* (2006.01)

(52) U.S. Cl.
CPC ............ *B62D 5/0463* (2013.01); *B62D 5/0481* (2013.01)
USPC ................. 318/432; 318/400.34; 318/400.01; 318/433

(58) Field of Classification Search
None
See application file for complete search history.

(56) References Cited

U.S. PATENT DOCUMENTS

| | | |
|---|---|---|
| 2005/0242765 A1* | 11/2005 | Ta et al. ........................ 318/799 |
| 2007/0278032 A1* | 12/2007 | Sakaguchi et al. ............ 180/446 |
| 2009/0167224 A1* | 7/2009 | Miura et al. ............. 318/400.23 |
| 2009/0240389 A1* | 9/2009 | Nomura et al. ................. 701/29 |
| 2011/0010052 A1* | 1/2011 | Limpibunterng et al. ...... 701/41 |
| 2011/0214934 A1* | 9/2011 | Ueda et al. .................... 180/446 |

FOREIGN PATENT DOCUMENTS

| | | |
|---|---|---|
| EP | 1 746 012 A1 | 1/2007 |
| JP | A-2004-66999 | 3/2004 |
| WO | WO 2009/122271 A1 | 10/2009 |

* cited by examiner

*Primary Examiner* — Eduardo Colon Santana
*Assistant Examiner* — Devon Joseph
(74) *Attorney, Agent, or Firm* — Oliff PLC

(57) ABSTRACT

In an electric power steering system, a back electromotive force constant is calculated on the basis of a steering angular velocity and an estimated induced voltage. Then, a rotation angular velocity of a motor is calculated as an estimated rotation angular velocity on the basis of a motor current, a motor voltage, the back electromotive force constant and a motor resistance.

13 Claims, 4 Drawing Sheets

ELECTRIC POWER STEERING SYSTEM

INCORPORATION BY REFERENCE

The disclosure of Japanese Patent Application No. 2011-116949 filed on May 25, 2011 including the specification, drawings and abstract, is incorporated herein by reference in its entirety.

BACKGROUND OF THE INVENTION

1. Field of the Invention

The invention relates to an electric power steering system that includes a motor that applies assist force to a steering system.

2. Description of Related Art

Japanese Patent Application Publication No. 2004-66999 (JP 2004-66999 A) describes a technique relating to an electric power steering system of the above-mentioned type. In such an electric power steering system, a rotation angular velocity ω of a motor is calculated according to Equation A indicated below. Then, various motor controls are executed on the basis of the magnitude of the rotation angular velocity ω.

In Equation A, Vm denotes a voltage between terminals of the motor, R denotes a resistance of the motor, Im denotes a motor current, and Ke denotes a back electromotive force constant (V·s/rad). Measured values are used as the motor current Im and the motor voltage Vm. A value obtained on the basis of a map that indicates the correlation between the motor current Im and the motor resistance Rm is used as R. A preset fixed value is used as Ke.

$$\omega=(Vm-R\times Im)/Ke \quad \text{Equation A}$$

The back electromotive force constant Ke is actually not a fixed value, and varies depending on, for example, a temperature of the motor. Therefore, there may arise a difference between the actual back electromotive force constant Ke and the back electromotive force constant Ke used to obtain the rotation angular velocity ω of the motor. If the difference is large, the rotation angular velocity ω calculated according to Equation A indicated above significantly deviates from the actual rotation angular velocity ω. As a result, the accuracy of various controls executed on the basis of the calculated rotation angular velocity ω decreases.

SUMMARY OF THE INVENTION

It is an object of the invention to provide an electric power steering system that is able to accurately control a motor on the basis of a rotation angular velocity of the motor.

An aspect of the invention relates to an electric power steering system that includes a motor that applies assist force to a steering system. The electric power steering system includes: a rotation angular velocity acquisition unit that acquires a corresponding rotation angular velocity that corresponds to a rotation angular velocity of the motor; an induced voltage calculation unit that calculates an induced voltage of the motor as an estimated induced voltage at the same time that the corresponding rotation angular velocity is acquired; a back electromotive force constant calculation unit that calculates a back electromotive force constant based on the corresponding rotation angular velocity and the estimated induced voltage; and a rotation angular velocity calculation unit that calculates a rotation angular velocity of the motor as an estimated rotation angular velocity based on a current of the motor, a voltage of the motor, the back electromotive force constant and a resistance of the motor.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
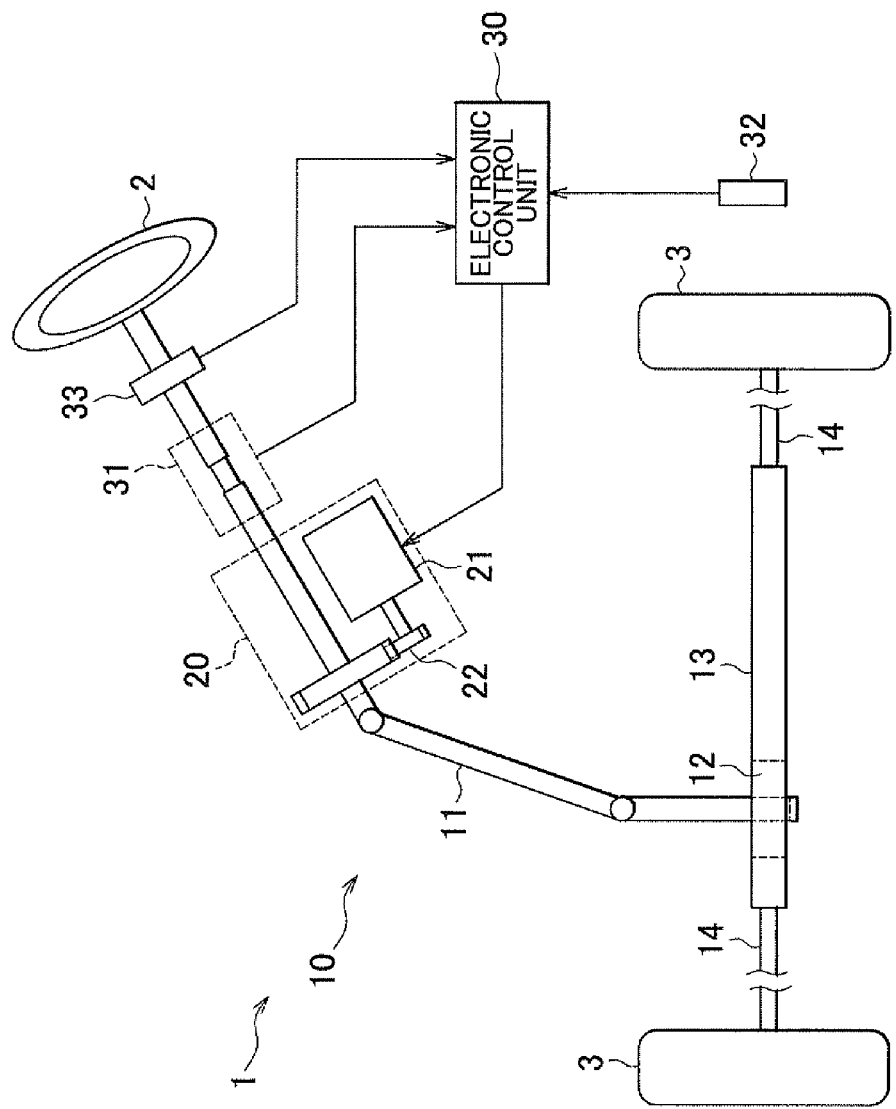
FIG. 1 is a view that schematically shows the overall structure of an electric power steering system according to an embodiment of the invention.

An embodiment of the invention will be described with reference to FIG. 1 to FIG. 4. An electric power steering system 1 includes a steering angle transmission mechanism (steering system) 10, an EPS actuator 20, and an electronic control unit 30. The steering angle transmission mechanism (steering system) 10 transmits rotation of a steering wheel 2 to steered wheels 3. The EPS actuator 20 applies force for assisting an operation of the steering wheel 2 (hereinafter, referred to as "assist force") to the steering angle transmission mechanism 10. The electronic control unit 30 controls the EPS actuator 20. Further, the electric power steering system 1 is provided with a plurality of sensors that detect the operating states of these devices.

The steering angle transmission mechanism 10 includes a steering shaft 11, a rack and pinion mechanism 12, a rack shaft 13, and tie rods 14. The steering shaft 11 rotates in response to an operation of the steering wheel 2. The rack and pinion mechanism 12 transmits rotation of the steering shaft 11 to the rack shaft 13. The rack shaft 13 operates the tie rods 14. The tie rods 14 respectively operate knuckles.

The EPS actuator 20 includes a motor 21 and a reduction mechanism 22. The motor 21 applies torque to the steering shaft 11. The reduction mechanism 22 reduces the speed of rotation of the motor 21. A brushed motor is employed as the motor 21. The rotation of the motor 21 is reduced in speed by the reduction mechanism 22 and is then transmitted to the steering shaft 11. At this time, torque applied from the motor 21 to the steering shaft 11 acts as assist force.

The steering angle transmission mechanism 10 operates as follows. That is, when the steering wheel 2 is operated, assist force is applied to the steering shaft 11, and the steering shaft 11 rotates. The rotation of the steering shaft 11 is converted to a linear motion of the rack shaft 13 by the rack and pinion mechanism 12. The linear motion of the rack shaft 13 is transmitted to the knuckles via the tie rods 14 that are coupled to respective ends of the rack shaft 13. Then, the steered angle of the steered wheels 3 is changed with the movement of the knuckles.

A steering angle $\theta s$ of the steering wheel 2 is determined using the neutral position of the steering wheel 2 as a reference position. That is, where the steering angle $\theta s$ of the steering wheel 2 that is placed at the neutral position is "0", when the steering wheel 2 is rotated clockwise or counterclockwise from the neutral position, the steering angle $\theta s$ increases with an increase in a rotation angle with respect to the neutral position.

The steering state of the steering wheel 2 is classified into "rotating state", "neutral state" and "retained state". The "rotating state" indicates the state where the steering wheel 2 is rotating. The "neutral state" indicates the state where the steering wheel 2 is placed at the neutral position. The "retained state" indicates the state where the steering wheel 2 is kept at a position that the steering wheel has reached after being rotated clockwise or counterclockwise from the neutral position. In addition, the "rotating state" is further classified into "turning state" and "returning state". The "turning state" indicates the state where the steering angle $\theta s$ is being increased. The "returning state" indicates the state where the steering angle $\theta s$ is being reduced.

The electric power steering system 1 includes a torque sensor 31, a vehicle speed sensor 32, and a steering sensor 33 (rotation angular velocity acquisition unit). The torque sensor 31 detects torque of the steering wheel 2. The vehicle speed sensor 32 detects a value corresponding to a vehicle speed. The steering sensor 33 detects the steering angle $\theta s$ of the steering wheel 2. These sensors output signals corresponding to changes in the states of the respective detection targets as follows.

The torque sensor 31 outputs a signal (hereinafter, referred to as "output signal SA"), corresponding to a magnitude of torque applied to the steering shaft 11 through an operation of the steering wheel 2, to the electronic control unit 30. The vehicle speed sensor 32 outputs a signal (hereinafter, referred to as "output signal SB"), corresponding to a rotation speed of the steered wheels 3, to the electronic control unit 30. The steering sensor 33 outputs a signal (hereinafter, referred to as "output signal SC"), corresponding to a rotation amount of the steering wheel 2, to the electronic control unit 30.

The electronic control unit 30 executes the following calculations on the basis of the signals output from the sensors. The electronic control unit 30 calculates a value corresponding to the magnitude of torque input into the steering shaft 11 (hereinafter, referred to as "steering torque $\tau$") through the operation of the steering wheel 2, on the basis of the output signal SA from the torque sensor 31. In addition, the electronic control unit 30 calculates a value corresponding to a traveling speed of the vehicle (hereinafter, referred to as "vehicle speed V") on the basis of the output signal SB from the vehicle speed sensor 32. In addition, the electronic control unit 30 calculates the steering angle $\theta s$ of the steering wheel 2 on the basis of the output signal SC from the steering sensor 33.

In addition, the electronic control unit 30 executes the following motor control. The electronic control unit 30 executes power assist control and steering torque shift control. In the power assist control, a motor output for applying assist force to the steering system is adjusted. In the steering torque shift control, the motor output is corrected to adjust a steering feel felt by a driver who operates the steering wheel 2.

In the steering torque shift control, the steering torque $\tau$ is corrected on the basis of the steering state of the steering wheel 2 to improve steering feel. Then, the corrected value is output as a corrected torque $\tau a$. In the power assist control, a current command value Ia for driving the motor 21 is calculated on the basis of the vehicle speed V and the corrected torque $\tau a$.

The configuration of the electronic control unit 30 will be described with reference to FIG. 2. The electronic control unit 30 includes a motor control unit 40 and a driving circuit 50. The motor control unit 40 generates a signal corresponding to driving electric power that is supplied to the motor 21 (hereinafter, referred to as "motor control signal Sm"). The driving circuit 50 supplies the motor 21 with driving electric power corresponding to the motor control signal Sm.

The driving circuit 50 is provided with a voltage sensor 51 and a current sensor 52. The voltage sensor 51 detects a voltage between terminals of the motor 21 (hereinafter, referred to as "motor voltage Vm"). The current sensor 52 detects a current supplied to the motor 21 (hereinafter, referred to as "motor current Im").

The motor control unit 40 includes a current command value calculation unit 60, a feedback correction unit 70, a motor control signal output unit 80, and a rotation angular velocity calculation unit 90. The current command value calculation unit 60 calculates a value of current that is supplied to the motor 21 (hereinafter, referred to as "current command value Ia"). The motor control signal output unit 80 generates the motor control signal Sm. The rotation angular velocity calculation unit 90 calculates the rotation angular velocity $\omega m$ of the motor 21 as an estimated rotation angular velocity $\omega ma$.

The feedback correction unit 70 corrects the current command value Ia on the basis of the difference between the motor current Im of the motor 21 and the current command value Ia for the motor 21, and executes feedback control such that the motor current Im converges to the current command value Ia. The motor control signal output unit 80 generates the motor control signal Sm on the basis of a corrected current command value Ib output from the feedback correction unit 70.

The current command value calculation unit 60 includes a basic assist calculation unit 61 and a torque shift calculation unit 62. The basic assist calculation unit 61 calculates a basic component of the current command value Ia (hereinafter, referred to as "basic control amount Ias"). The torque shift calculation unit 62 corrects the steering torque $\tau$ on the basis of the vehicle speed V and the estimated rotation angular velocity $\omega ma$.

The torque shift calculation unit 62 corrects the steering torque $\tau$ (steering torque shift control). Specifically, when the steering wheel 2 is in the retained state or the returning state, the torque shift calculation unit 62 corrects the steering torque $\tau$ to increase the steering torque $\tau$. In addition, when the steering wheel 2 is in the retained state or the returning state, the torque shift calculation unit 62 increases an amount of increase in the steering torque $\tau$ as the vehicle speed V decreases, and increases an amount of increase in the steering torque $\tau$ as the absolute value of the estimated rotation angular velocity $\omega ma$ increases.

On the other hand, when the steering wheel 2 is in the turning state, the torque shift calculation unit 62 sets the correction amount of the steering torque $\tau$ at "0". That is, the torque shift calculation unit 62 makes an assist amount larger when the steering wheel 2 is in the retained state or in the returning state than when the steering wheel 2 is in the turning state. Thus, the steering feel improves.

In which of the turning state, the retained state and the returning state the steering wheel 2 is determined by the following method. That is, when the sign of the steering torque $\tau$ coincides with the sign of the estimated rotation angular velocity ωma, it is determined that the steering wheel 2 is in the turning state. When the sign of the steering torque τ does not coincide with the sign of the estimated rotation angular velocity ωma, it is determined that the steering wheel 2 is in the returning state. When the absolute value of the estimated rotation angular velocity ωma is smaller than a predetermined value ω0, it is determined that the steering wheel 2 is in the retained state.

The basic assist calculation unit 61 calculates a basic control amount Ias on the basis of the corrected torque τa and the vehicle speed V. Specifically, the basic assist calculation unit 61 increases the basic control amount Ias as the vehicle speed V decreases. In addition, the basic assist calculation unit 61 increases the basic control amount Ias as the corrected torque τa increases.

The rotation angular velocity calculation unit 90 calculates the estimated rotation angular velocity ωma according to Equation 1 indicated below, which serves as a motor equation. The estimated rotation angular velocity ωma is used in the torque shift calculation unit 62. Note that the brushed motor 21 is not provided with a sensor that detects the rotation angular velocity ωm of the motor 21, so the rotation angular velocity ωm of the motor 21 is calculated as the estimated rotation angular velocity ωma according to Equation 1 indicated below.

$$\omega ma = (Vm - Im \times Rm)/Ke \qquad \text{Equation 1}$$

"Vm" denotes a motor voltage Vm (voltage between the terminals) received from the voltage sensor 51.
"Im" denotes a motor current Im received from the current sensor 52.
"Rm" denotes a motor resistance Rm prestored in a storage unit. A preset fixed value is used as the motor resistance Rm.
"Ke" denotes a back electromotive force constant.

With the above-described configuration, the motor control unit 40 operates as follows. That is, the motor control unit 40 calculates the estimated rotation angular velocity ωma using the rotation angular velocity calculation unit 90. Then, the motor control unit 40 corrects the steering torque τ on the basis of the estimated rotation angular velocity ωma and the vehicle speed V, and calculates the corrected torque τa. Furthermore, the motor control unit 40 generates the basic control amount Ias on the basis of the corrected torque τa and the vehicle speed V. The basic control amount Ias is corrected on the basis of the motor current Im through feedback control to generate the corrected current command value Ib. Then, the motor control signal Sm is generated on the basis of the corrected current command value Ib obtained by correcting the basic control amount Ias.

Figure 2:
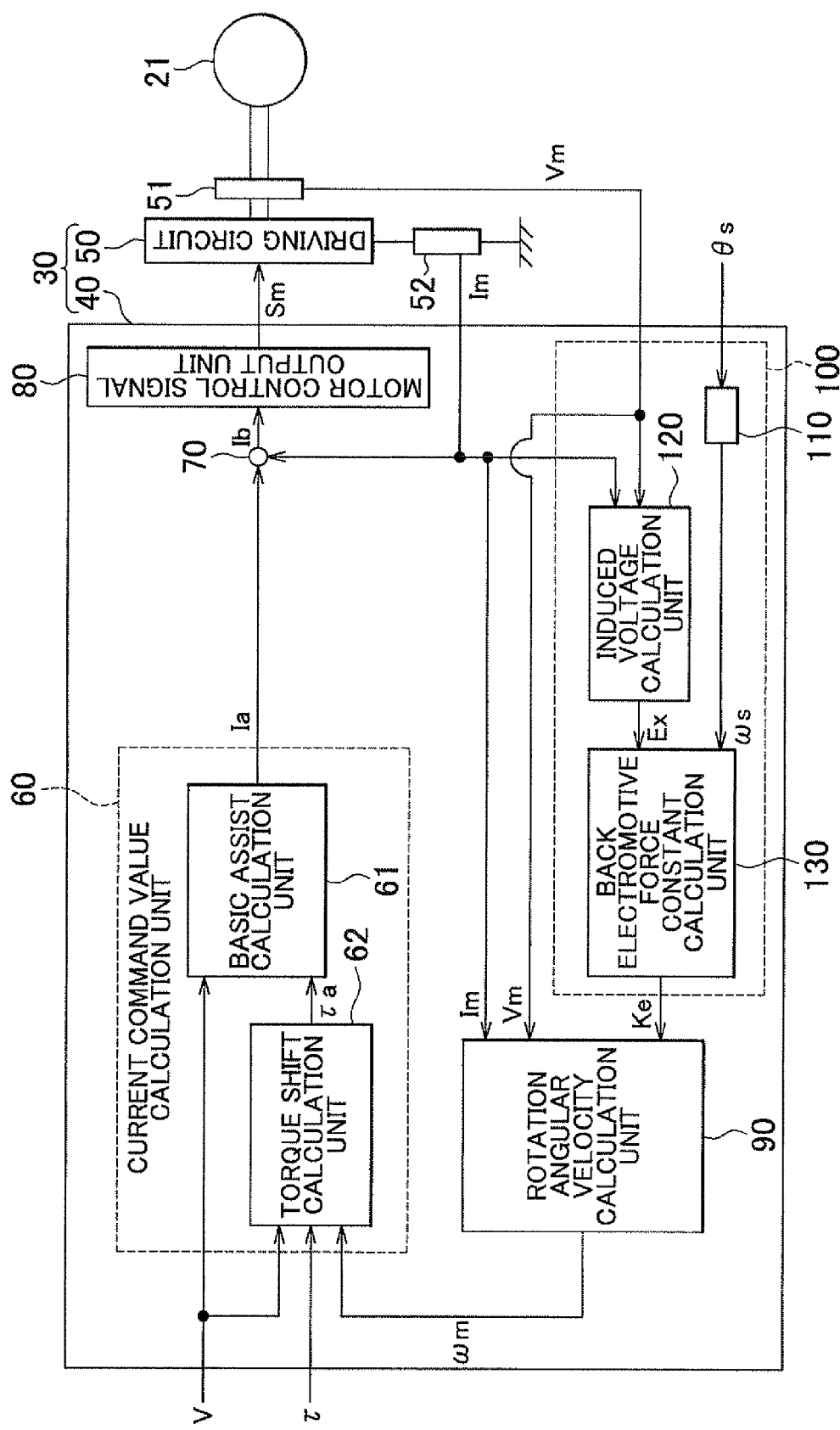
FIG. 2 is a block diagram that shows the configuration of a control system of the electric power steering system according to the embodiment.

As shown in FIG. 2, the motor control unit 40 includes a back electromotive force constant updating unit 100 that updates the back electromotive force constant Ke, in addition to the above-described calculation elements. The back electromotive force constant updating unit 100 includes a steering angular velocity calculation unit 110, an induced voltage calculation unit 120, and a back electromotive force constant calculation unit 130. The steering angular velocity calculation unit 110 calculates a steering angular velocity ωs on the basis of the steering angle θs. The induced voltage calculation unit 120 estimates the induced voltage E of the motor 21. The back electromotive force constant calculation unit 130 calculates the back electromotive force constant Ke of the motor 21.

The induced voltage calculation unit 120 calculates an estimated induced voltage EX of the motor 21 according to Equation 2 and Equation 3, using a disturbance observer. The disturbance observer calculates the estimated induced voltage EX according to the following equations, for example.

$$d\xi/dt = (G/L) \cdot \{Vm + (G - Rm) \cdot Im - \xi\} \qquad \text{Equation 2}$$

$$EX = \xi - G \cdot Im \qquad \text{Equation 3}$$

"ξ" denotes an intermediate variable.
"G" denotes an observer gain (fixed value).
"EX" denotes an estimated induced voltage.
"L" denotes an inductance.
"/dt" denotes temporal differentiation.

The induced voltage calculation unit 120 calculates the estimated induced voltage EX when the following first to third conditions are satisfied. Then, the calculated steering angular velocity ωs and estimated induced voltage EX are stored as a set of data.

First Condition: The absolute value of the steering angular velocity ωs is larger than a threshold HA.

Second Condition: The absolute value of an amount of change (a rate of change) in the steering angular velocity ωs is smaller than a reference change amount HB.

Third Condition: The absolute value of a difference between the steering angular velocity ωs when the estimated induced voltage EX is calculated in the present routine and the steering angular velocity ωs when the estimated induced voltage EX is calculated in the immediately preceding routine is smaller than a set value DS.

The conditions (the first to third conditions) for calculating the estimated induced voltage EX will be described with reference to FIG. 3A to FIG. 3C. The steering angular velocity ωs is periodically detected. The steering angular velocity ωs changes depending on the operating state of the steering wheel 2. When the steering wheel 2 is in the turning state, the steering angular velocity ωs increases in the positive direction. When the steering wheel 2 is in the retained state, the steering angular velocity ωs takes a value close to 0. When the steering wheel 2 is in the returning state, the steering angular velocity ωs increases in the negative direction.

Figure 3A:
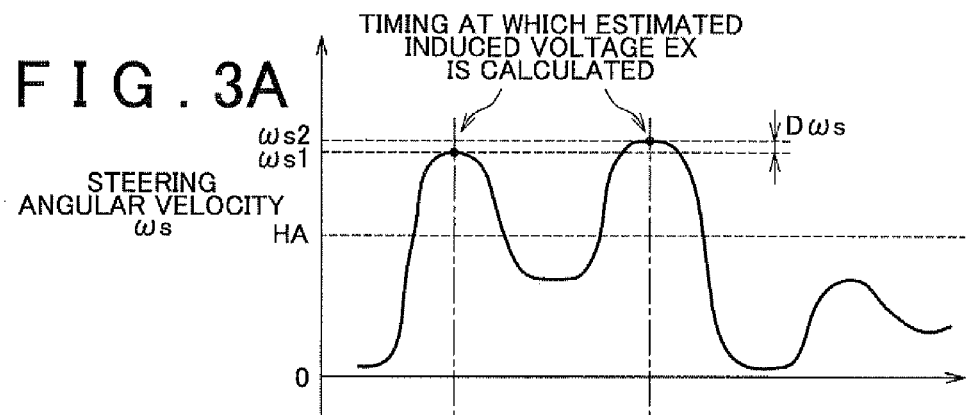
FIG. 3A to FIG. 3C are graphs that show the correlation among a steering angular velocity, an amount of change in the steering angular velocity and timing at which an estimated induced voltage and a back electromotive force constant are calculated in the electric power steering system according to the embodiment.

For example, as shown in the graph of the steering angular velocity ωs in FIG. 3A, when the steering wheel 2 is turned, the magnitude of the steering angular velocity ωs changes with a change in a driver's steering operation. The graph shows a state where the steering wheel 2 is rotated while the steering angular velocity ωs is changed in the same direction as a driver's steering operation direction.

Figure 3B:
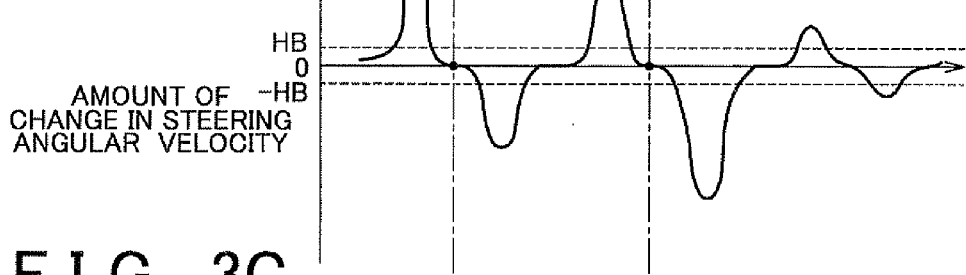
Figure 3C:
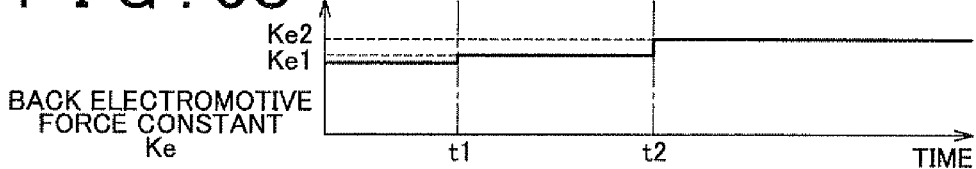

At this time, as shown in the graph of the amount of change in the steering angular velocity ωs in FIG. 3B, the amount of change (rate of change) in the steering angular velocity ωs increases in the positive direction when the steering angular velocity ωs increases, becomes a value substantially equal to 0 when the steering angular velocity ωs is constant, and increases in the negative direction when the steering angular velocity ωs decreases.

In such a change in the steering angular velocity ωs, the estimated induced voltage EX is calculated when the above-described first to third conditions are satisfied. That is, as shown in FIG. 3A to FIG. 3C, the estimated induced voltage EX is calculated, when the absolute value of the steering angular velocity ωs is large, the amount of change in the steering angular velocity ωs is small, and the absolute value Dos of the difference between the steering angular velocity ωs in the present routine and the steering angular velocity ωs when the estimated induced voltage EX is calculated in the immediately preceding routine is smaller than the set value DS. That is, when the steering angular velocity ωs is stable and the estimated induced voltage EX takes a relatively large value, the estimated induced voltage EX is calculated.

The procedure of a routine of calculating the estimated induced voltage EX will be described with reference to FIG. 4. Note that the routine is repeatedly executed by the electronic control unit 30 at predetermined calculation intervals. In step S110, it is determined whether the absolute value of the steering angular velocity ωs is larger than the threshold HA. When the absolute value of the steering angular velocity ωs is smaller than or equal to the threshold HA, the present calculation routine ends. On the other hand, when the absolute value of the steering angular velocity ωs is larger than the threshold HA, the next step is executed.

In step S120, it is determined whether the absolute value of the amount of change (rate of change) in the steering angular velocity ωs is smaller than the reference change amount HB. When the amount of change (rate of change) in the steering angular velocity ωs is larger than or equal to the reference change amount HB, the present calculation routine ends. On the other hand, when the amount of change (rate of change) in the steering angular velocity ωs is smaller than the reference change amount HB, the next step is executed In step S130, it is determined whether the absolute value Dωs of the difference between a steering angular velocity ωs1 (a first steering angular velocity ωs1 that may be used as a first corresponding rotation angular velocity in the invention) when the estimated induced voltage EX is calculated in the immediately preceding calculation routine and a steering angular velocity ωs2 (a second steering angular velocity ωs2 that may be used as a second corresponding rotation angular velocity in the invention) in the present calculation routine is smaller than the set value DS. When a negative determination is made, the present calculation routine ends. On the other hand, when an affirmative determination is made, the estimated induced voltage EX is calculated in step S140.

Next, the back electromotive force constant calculation unit 130 will be described. The back electromotive force constant calculation unit 130 calculates a new back electromotive force constant Ke according to Equation 4.

$$Ke2 = EX2/EX1 \times Ke1 \qquad \text{Equation 4}$$

"EX1" denotes the first estimated induced voltage at the steering angular velocity ωs1.
"EX2" denotes the second estimated induced voltage at the steering angular velocity ωs2.
"Ke1" denotes a first back electromotive force constant at the steering angular velocity ωs1.
"Ke2" denotes a second back electromotive force constant at the steering angular velocity ωs2. That is, "Ke2" denotes a back electromotive force constant that is calculated in the present calculation routine.
The absolute value of the difference between the steering angular velocity ωs1 and the steering angular velocity ωs2 is smaller than the set value DS.

The manner of deriving Equation 4 will be described below. Generally, the relation among the induced voltage E of the motor 21, the back electromotive force constant Ke and the rotation angular velocity ωm of the motor 21 is as follows.

"Induced voltage $E$"="Back electromotive force constant $Ke$"×"Rotation angular velocity $\omega m$ of the motor"  Equation 5

Equation 51 and Equation 52 indicated below are established based on Equation 5.

"Induced voltage $E1$"="First back electromotive force constant $Ke1$"×"Rotation angular velocity $\omega m1$"  Equation 51

"Induced voltage $E2$"="Second back electromotive force constant $Ke2$"×"Rotation angular velocity $\omega m2$"  Equation 52

The induced voltage E1, the first back electromotive force constant Ke1 and the rotation angular velocity ωm1 of the motor 21 respectively indicate the induced voltage E, the back electromotive force constant Ke and the rotation angular velocity ωm of the motor 21 at time t1. The induced voltage E2, the second back electromotive force constant Ke2 and the rotation angular velocity ωm2 of the motor 21 respectively indicate the induced voltage E, the back electromotive force constant Ke and the rotation angular velocity ωm of the motor 21 at time t2.

Note that, in the following description, the induced voltage E1 will be denoted by "E1", the induced voltage E2 will be denoted by "E2", the first back electromotive force constant Ke1 will be denoted by "Ke1", the second back electromotive force constant Ke2 will be denoted by "Ke2", the rotation angular velocity ωm1 of the motor 21 will be denoted by "ωm1" and the rotation angular velocity ωm2 of the motor 21 will be denoted by "ωm2".

When ωm1 is equal to ωm2, Equation 6 is established.

$$Ke2 = E2/E1 \times Ke1 \qquad \text{Equation 6}$$

That is, when the rotation angular velocity ωm1 of the motor 21, acquired at time t1, and the rotation angular velocity ωm2 of the motor 21, acquired at time t2, coincide with each other, the second back electromotive force constant Ke2 at time t2 is calculated on the basis of the first back electromotive force constant Ke1 at time t1 and the ratio of the induced voltage E2 at time t2 to the induced voltage E1 at time t1.

In the case of the brushed motor 21, it is not possible to acquire an actual value of the rotation angular velocity ωm of the motor 21. In addition, generally, it is also not possible to acquire an actual value of the induced voltage E of the motor 21. Then, the parameters in Equation 6, that is, the rotation angular velocity ωm and induced voltage E of the motor 21 are replaced as follows.

Because the rotation angular velocity ωm of the motor 21 is correlated with the steering angular velocity ωs, the steering angular velocity ωs is used instead of the rotation angular velocity ωm of the motor 21. In addition, instead of the induced voltage E, the estimated induced voltage EX calculated by the disturbance observer is used. It is possible to accurately calculate the estimated induced voltage EX with the use of the disturbance observer, so an error due to this replacement is small.

Equation 4 described above is derived in the above manner. The back electromotive force constant Ke that is newly calculated according to Equation 4 is stored as the newest back electromotive force constant Ke. Then, the newest back electromotive force constant Ke is used to calculate the estimated rotation angular velocity ωma of the motor 21.

Update of the back electromotive force constant Ke will be described with reference to the graph of the back electromotive force constant Ke shown in FIG. 3C. At time t1, the steering angular velocity ωs satisfies the first to third conditions. At this time, the first back electromotive force constant Ke1 is calculated. Then, the first back electromotive force constant Ke1 is stored as a new back electromotive force constant Ke.

At time t2, the steering angular velocity ωs satisfies the first to third conditions. At this time, the second estimated induced voltage EX2 is calculated. Then, the first estimated induced voltage EX1 when the steering angular velocity ωs satisfies the first to third conditions last time is used, and a new second back electromotive force constant Ke2 is calculated according to Equation 4. Then, the second back electromotive force constant Ke2 is stored as a new back electromotive force constant Ke.

Next, the operation and advantageous effects of calculating a new back electromotive force constant Ke according to Equation 4 will be described. Conventionally, the motor equation indicated in Equation 1 has been used to calculate the rotation angular velocity ωm of the motor 21, that is, the motor 21 that is not provided with a rotation angular velocity detecting device (resolver). Then, a fixed value has been used as the back electromotive force constant Ke.

However, it is found that it is necessary to correct the back electromotive force constant Ke to accurately obtain the rotation angular velocity ωm of the motor 21. That is, it becomes apparent that the back electromotive force constant Ke changes depending on a temperature of the motor 21 and abrasion, or the like, of components of the motor 21. Further, it is found that a change in the back electromotive force constant Ke is non-negligible in accurately calculating the rotation angular velocity ωm.

Then, the back electromotive force constant Ke is calculated on the basis of an actual physical quantity of the motor 21. Specifically, the back electromotive force constant Ke is calculated according to Equation 4. Then, this value is used to calculate the estimated rotation angular velocity ωma of the motor 21. Therefore, the estimated rotation angular velocity ωma is calculated on the basis of the back electromotive force constant Ke corresponding to the state of the motor 21. As a result, the accuracy increases. That is, the absolute value of the difference between the estimated rotation angular velocity ωma and the actual rotation angular velocity ωm reduces. Thus, the control accuracy of steering torque shift control based on the estimated rotation angular velocity ωma increases. As a result, the steering feel improves.

Furthermore, the estimated induced voltage EX used to calculate the back electromotive force constant Ke is calculated when the first to third conditions are satisfied, as described above. That is, according to the first condition, when the absolute value of the steering angular velocity ωs is larger than the threshold HA, that is, when an error included in the estimated induced voltage EX is small, the back electromotive force constant Ke is calculated. Therefore, the accuracy of the back electromotive force constant Ke increases.

In addition, according to the second condition, when the absolute value of the amount of change (the rate of change) in the steering angular velocity ωs is smaller than the reference change amount HB, the estimated induced voltage EX is calculated. Therefore, variations of the estimated induced voltage EX against the steering angular velocity ωs are reduced. Because the back electromotive force constant Ke is calculated on the basis of the estimated induced voltage EX, the accuracy of the back electromotive force constant Ke increases.

That is, in comparison with the case where the estimated induced voltage EX is calculated without requiring satisfaction of the first and second conditions, the accuracy of the estimated induced voltage EX improves. Therefore, the back electromotive force constant Ke is calculated further accurately.

According to the third condition, the following advantageous effects are obtained. According to the third condition, the estimated induced voltage EX is calculated when the motor 21 is in substantially the same motion condition, that is, when the steering angular velocity ωs1 at the time when the estimated induced voltage EX is calculated in the immediately preceding routine is close to the steering angular velocity ωs2 at the time when the estimated induced voltage EX is calculated in the present routine (the absolute value of the difference between ωs1 and ωs2 is smaller than the set value DS). Then, as shown in Equation 4, the back electromotive force constant Ke is calculated on the basis of the ratio between the two estimated induced voltages EX when the motor 21 is in substantially the same motion condition.

When the back electromotive force constant Ke is calculated on the basis of the ratio between the two estimated induced voltages EX calculated when the motor 21 is in different motion conditions, it is necessary to take into account contribution of parameters, other than the estimated induced voltage EX, to the back electromotive force constant Ke. However, according to the third condition, it is almost unnecessary to take into account contribution of such parameters, other than the estimated induced voltage EX. Therefore, it is possible to further accurately calculate the back electromotive force constant Ke.

An alternative embodiment of a method of calculating the back electromotive force constant Ke will be described. In the above-described embodiment, a new back electromotive force constant Ke is calculated according to Equation 4.

In the case where Equation 4 is used, when the absolute value of the difference between the steering angular velocity ωs1 and the steering angular velocity ωs2 is smaller than the set value DS, the back electromotive force constant Ke is calculated using the first estimated induced voltage EX1 and the second estimated induced voltage EX2 that correspond to the steering angular velocity ωs1 and the steering angular velocity ωs2, respectively. That is, when the absolute value of the difference between the steering angular velocity ωs1 and the steering angular velocity ωs2 is smaller than the set value DS, the back electromotive force constant Ke is updated.

In contrast to this, in the alternative embodiment, the back electromotive force constant Ke is calculated without requiring satisfaction of the condition that the absolute value of the difference between the steering angular velocity ωs1 and the steering angular velocity ωs2 is smaller than the set value DS. Generally, Equation 5, that is, Equation 51 and Equation 52, are satisfied. Here, the left-hand side of Equation 52 is divided by the left-hand side of Equation 51, and the right-hand side of Equation 51 is divided by the right-hand side of Equation 2. Thus, Equation 7 is established.

$$Ke2=(E2/E1)\times(\omega m1/\omega m2)\times Ke1 \quad \text{Equation 7}$$

Then, as in the case described above, instead of the "induced voltage E", the "estimated induced voltage EX" is used. In addition, the rotation angular velocity ωm of the motor 21 is correlated with the steering angular velocity ωs. Therefore, "ωs1/ωs2" is used instead of "ωm1/ωm2".

In this way, Equation 8 is established.

$$Ke2=(EX2/EX1)\times(\omega s1/\omega s2)\times Ke1 \quad \text{Equation 8}$$

That is, a new second back electromotive force constant Ke2 is calculated on the basis of the steering angular velocity ωs1, the steering angular velocity ωs2, the first estimated induced voltage EX1 at the steering angular velocity ωs1, the second estimated induced voltage EX2 at the steering angular velocity ωs2, and the first back electromotive force constant Ke1 calculated last time.

Note that, even when the back electromotive force constant Ke is calculated according to Equation 8, it is considered that the absolute value of the difference between the steering angular velocity ωs1 and the steering angular velocity ωs2 is desirably smaller than a predetermined set value DSa. This is because, when the absolute value of the difference between the steering angular velocity ωs1 and the steering angular velocity ωs2 is large, the motor 21 is in the different motion conditions and, therefore, it is considered that contribution of parameters, other than the estimated induced voltage EX and the steering angular velocity ωs, to the back electromotive force constant Ke exerts an influence.

According to the present embodiment, the following operation and advantageous effects are obtained.

(1) In the present embodiment, the back electromotive force constant Ke is calculated on the basis of the steering angular velocity ωs and the estimated induced voltage EX.

The back electromotive force constant Ke is a value based on the induced voltage EX and the rotation angular velocity ωm of the motor 21. Therefore, the back electromotive force constant Ke is calculated on the basis of the steering angular velocity ωs, corresponding to the rotation angular velocity ωm of the motor 21, and the estimated induced voltage EX.

That is, the back electromotive force constant Ke is not set at a fixed value, and the back electromotive force constant Ke is calculated using the parameters based on the actual motor 21. Therefore, it is possible to reduce the absolute value of the difference between the actual back electromotive force constant Ke and the back electromotive force constant Ke used to calculate the estimated rotation angular velocity ωma.

Because the estimated rotation angular velocity ωma is calculated on the basis of the thus obtained back electromotive force constant Ke, it is possible to reduce the frequency at which the absolute value of the difference between the estimated rotation angular velocity ωma and the actual rotation angular velocity ωm is large. As a result, it is possible to improve the control accuracy of various controls that are executed on the basis of the estimated rotation angular velocity ωma.

(2) In the present embodiment, the second back electromotive force constant Ke2 is calculated on the basis of the first back electromotive force constant Ke1 and the ratio of the second estimated induced voltage EX2 to the first estimated induced voltage EX1. With this configuration, a new back electromotive force constant Ke is calculated in association with the degree of change in the estimated induced voltage EX. That is, the degree of change in the estimated induced voltage EX under a predetermined condition is reflected in the back electromotive force constant Ke. Therefore, it is possible to suppress an increase in the absolute value of the difference between the actual back electromotive force constant Ke and the back electromotive force constant Ke used to calculate the estimated rotation angular velocity ωma.

Figure 4:
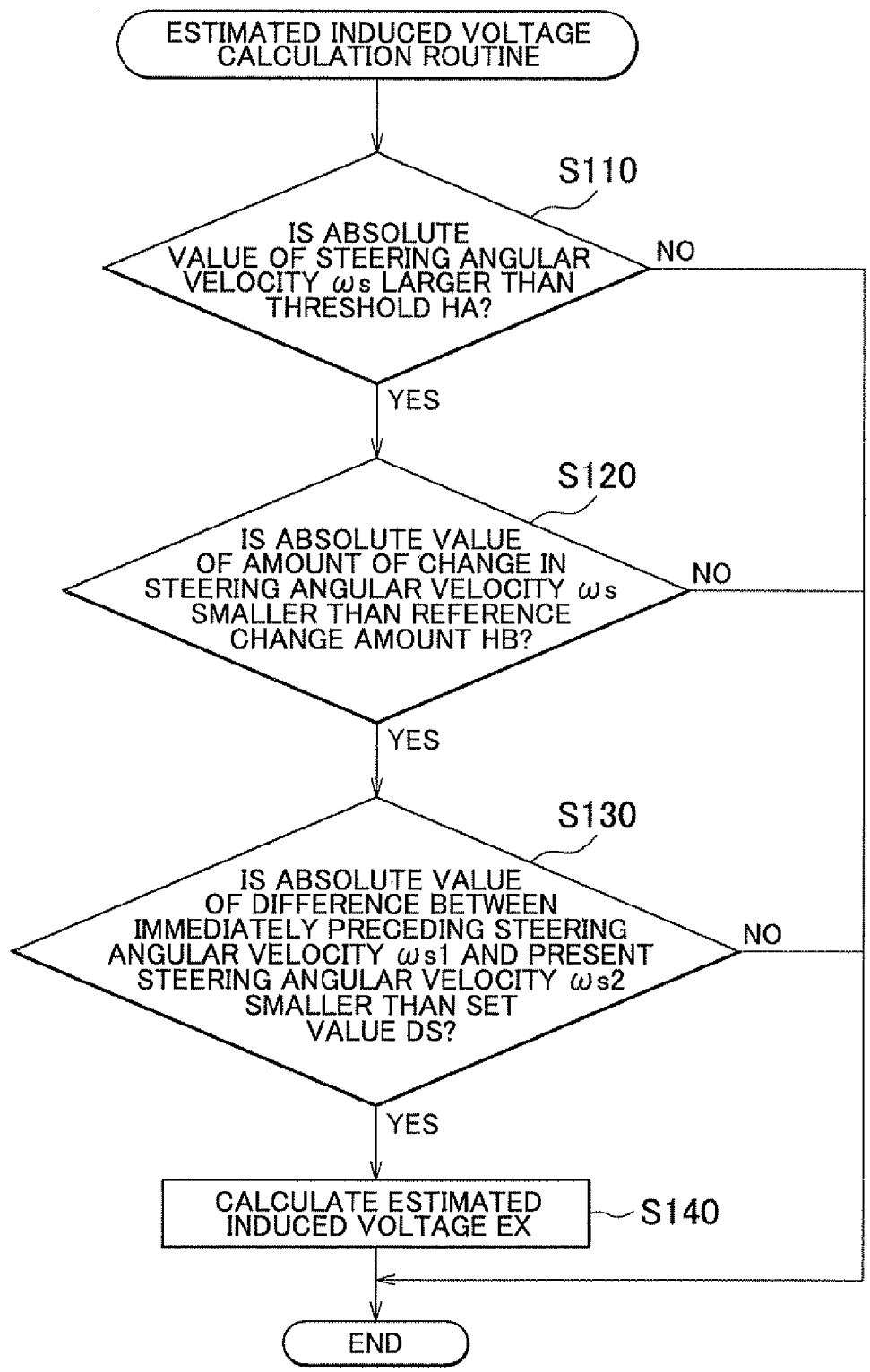
FIG. 4 is a flowchart that shows the procedure of "estimated induced voltage calculation routine" that is executed by an electronic control unit according to the embodiment.

(3) In the present embodiment, as shown in FIG. 3A to FIG. 4, the estimated induced voltage EX is calculated when the absolute value of the steering angular velocity ωs is larger than the threshold HA. When the rotation angular velocity corn of the motor 21 is reduced, the induced voltage (estimated induced voltage EX) is also reduced. Note that, there is a deviation between the estimated induced voltage EX and the actual induced voltage E of the motor 21.

When the estimated induced voltage EX is low, an error included in the absolute value of the estimated induced voltage EX is large. Therefore, when the back electromotive force constant Ke is calculated on the basis of the estimated induced voltage EX, the accuracy of the back electromotive force constant Ke is low as compared with the case where the back electromotive force constant Ke is calculated when the absolute value of the estimated induced voltage EX is large.

However, with the above-described configuration, the back electromotive force constant Ke is calculated on the basis of the estimated induced voltage EX when the absolute value of the steering angular velocity ωs is larger than the threshold HA, that is, when the induced voltage (estimated induced voltage EX) is high. Thus, it is possible to further improve the accuracy of the back electromotive force constant Ke.

(4) In the present embodiment, the estimated induced voltage EX is calculated when the condition that the absolute value of the amount of change in the steering angular velocity ωs is smaller than the reference change amount HB is satisfied in addition to the requirement in the above description (3). The reason of this is as follows.

Even when the estimated induced voltage EX is calculated at a predetermined steering angular velocity ωs, the estimated induced voltage EX calculated when the amount of change in the steering angular velocity ωs is large may be different from the estimated induced voltage EX calculated when the absolute value of the amount of change in the steering angular velocity ωs is small.

This is because there is a time lag between the time at which the estimated induced voltage EX is calculated and the time at which it is determined that the steering angular velocity ωs is the predetermined value. That is, if the absolute value of the amount of change in the steering angular velocity ωs is not limited as the condition for calculating the estimated induced voltage EX, the estimated induced voltage EX may vary.

However, with the above configuration, the condition that the absolute value of the amount of change in the steering angular velocity ωs is smaller than the reference change amount HB is used as the condition for calculating the estimated induced voltage EX. Therefore, it is possible to suppress variations in estimated induced voltage EX at the time of calculating the estimated induced voltage EX. Thus, it is possible to improve the accuracy of the back electromotive force constant Ke.

(5) In the present embodiment, the estimated induced voltage EX is calculated when the condition that the absolute value of the difference between the previous steering angular velocity ωs1 (first steering angular velocity) and the current steering angular velocity ωs2 (second steering angular velocity) is smaller than the set value DS is satisfied in addition to the requirement in the above description (4).

When there is a difference between the steering angular velocity ωs1 in the immediately preceding routine and the steering angular velocity ωs2 in the present routine, as described in the alternative embodiment, a new back electromotive force constant Ke is calculated on the basis of the ratio of the steering angular velocity ωs1 in the immediately preceding routine to the steering angular velocity ωs2 in the present routine and the ratio of the second estimated induced voltage EX2 to the first estimated induced voltage EX1.

On the other hand, in the above configuration, the condition that the absolute value of the difference between the steering angular velocity ωs2 in the immediately preceding routine and the steering angular velocity ωs2 in the present routine is smaller than the set value DS is set as the condition for calculating the estimated induced voltage EX. Therefore, it is possible to easily calculate the back electromotive force constant Ke.

(6) In the present embodiment, in order to calculate the back electromotive force constant Ke according to Equation 5, the actual rotation angular velocity ωm of the motor 21 is required as a parameter. However, in the above configuration, the steering angular velocity ωs is used as a corresponding rotation angular velocity in place of the rotation angular velocity ωm of the motor 21.

The steering angular velocity ωs is correlated with the rotation angular velocity ωm of the motor 21. It is considered that, instead of the steering angular velocity ωs, for example, the steered velocity of the steered wheels 3 may be used. However, when the number of mechanical elements interposed between the motor 21 and the steered wheels 3 is larger than the number of mechanical elements interposed between the motor 21 and the steering wheel 2, the correlation between the steered velocity of the steered wheels 3 and the rotation angular velocity ωm of the motor 21 is low. That is, the correlation between the steering angular velocity ωs and the rotation angular velocity ωm of the motor 21 is higher than the correlation between the steered velocity of a steering system component, which is located further away from the motor 21 than the mechanical elements between the motor 21 and the steered wheels 3, and the rotation angular velocity ωm of the motor 21.

Therefore, with the above configuration, it is possible to accurately calculate the back electromotive force constant Ke in comparison with the case where the steered velocity of the steering system component located further away from the motor 21 is used as the corresponding rotation angular velocity.

Note that the invention is not limited to the above-described embodiments, and may be implemented, for example, in the following alternative embodiments. In addition, the following alternative embodiments are not only applied to the above-described embodiments, and may be implemented in combination.

In the above-described embodiments, the motor resistance Rm is a fixed value. However, because there is a correlation between the motor resistance Rm and the motor current Im, the motor resistance Rm may be corrected on the basis of the motor current Im. Specifically, a map that indicates the correlation between the motor resistance Rm and the motor current Im is set in advance, and the motor resistance Rm is corrected on the basis of the map. With this configuration, it is possible to further accurately calculate the rotation angular velocity ωm of the motor 21.

In the above-described embodiments, the above-described disturbance observer is used to calculate the estimated induced voltage EX. However, the disturbance observer is not limited to the configuration based on Equation 2 and Equation 3. That is, as long as a disturbance observer is derived by modeling a motor equation with the estimated induced voltage EX regarded as a turbulence element, the disturbance observer may be employed as a method of calculating the estimated induced voltage EX.

In the above-described embodiment, the first to third conditions for calculating the estimated induced voltage EX are provided. Then, it is determined whether the first to third conditions are satisfied using the steering angular velocity ωs as a parameter.

The parameter used to determine whether the first to third conditions are satisfied may be a physical quantity other than the steering angular velocity ωs. That is, a parameter in the condition for calculating the estimated induced voltage EX may be the a parameter that is correlated with the rotation angular velocity ωm of the motor 21.

For example, instead of the steering angular velocity ωs, the displacement (the amount of motion) of the rack shaft 13 may be used. The displacement of the rack shaft 13 is correlated with the rotation angular velocity ωm of the motor 21. Therefore, even when the displacement of the rack shaft 13 is used as a parameter, it is possible to obtain the estimated induced voltage EX required to accurately calculate the back electromotive force constant Ke. In addition, other than the displacement of the rack shaft 13, for example, a gear rotation speed of the reduction mechanism 22 or the estimated rotation angular velocity ωma may be used.

In the above-described embodiments, Equation 4 and Equation 8 are described as the equations for calculating the back electromotive force constant Ke. However, these equations may be corrected with a predetermined coefficient so that the calculated back electromotive force constant Ke is approximated to the actual back electromotive force constant Ke.

In the above-described embodiments, the invention is applied to the electric power steering system 1 that includes the brushed motor as the motor 21 of the EPS actuator 20. Alternatively, the invention may be applied to the electric power steering system 1 that includes a brushless motor as the motor 21 of the EPS actuator 20.

In the above-described embodiment, the invention is applied to the column-type electric power steering system 1. Alternatively, the invention may be applied to a pinion-type electric power steering system or a rack assist-type electric power steering system. In this case as well, configurations similar to the above embodiments are employed. Thus, advantageous effects similar to the advantageous effects of the above embodiments may be obtained.

According to the invention, it is possible to provide the electric power steering system that is able to accurately control the motor on the basis of the rotation angular velocity of the motor.

What is claimed is:

1. An electric power steering system that includes a motor that applies assist force to a steering system, comprising:
   a rotation angular velocity acquisition unit that acquires a corresponding rotation angular velocity that corresponds to a rotation angular velocity of the motor;
   an induced voltage calculation unit that calculates an induced voltage of the motor as an estimated induced voltage at the same time that the corresponding rotation angular velocity is acquired;
   a back electromotive force constant calculation unit that calculates a back electromotive force constant based on the corresponding rotation angular velocity and the estimated induced voltage; and
   a rotation angular velocity calculation unit that calculates a rotation angular velocity of the motor as an estimated rotation angular velocity based on a current of the motor, a voltage of the motor, the back electromotive force constant and a resistance of the motor,
   wherein
   when a magnitude of the corresponding rotation angular velocity is higher than a threshold, an amount of change in the corresponding rotation angular velocity is smaller than a reference chance amount and an absolute value of a difference between a first corresponding rotation angular velocity and a second corresponding rotation angular velocity is smaller than a set value, the estimated induced voltage is calculated.

2. The electric power steering system according to claim 1, wherein
   the corresponding rotation angular velocity acquired by the rotation angular velocity acquisition unit is set as the first corresponding rotation angular velocity,
   the corresponding rotation angular velocity acquired after acquisition of the first corresponding rotation angular velocity is set as the second corresponding rotation angular velocity,
   the estimated induced voltage that corresponds to the first corresponding rotation angular velocity is set as a first estimated induced voltage,
   the estimated induced voltage that corresponds to the second corresponding rotation angular velocity is set as a second estimated induced voltage, the back electromotive force constant that corresponds to the first estimated induced voltage is set as a first back electromotive force constant, the back electromotive force constant that corresponds to the second estimated induced voltage is set as a second back electromotive force constant, and the back electromotive force constant calculation unit calculates the second back electromotive force constant based on the first back electromotive force constant and a ratio of the second estimated induced voltage to the first estimated induced voltage.

3. The electric power steering system according to claim 2, wherein when a magnitude of the corresponding rotation angular velocity is higher than a threshold, the estimated induced voltage is calculated.

4. The electric power steering system according to claim 3, wherein the corresponding rotation angular velocity is a steering angular velocity of a steering wheel or a displacement of a rack shaft.

5. The electric power steering system according to claim 2, wherein when a magnitude of the corresponding rotation angular velocity is higher than a threshold and an amount of change in the corresponding rotation angular velocity is smaller than a reference change amount, the estimated induced voltage is calculated.

6. The electric power steering system according to claim 5, wherein the corresponding rotation angular velocity is a steering angular velocity of a steering wheel or a displacement of a rack shaft.

7. The electric power steering system according to claim 2, wherein the corresponding rotation angular velocity is a steering angular velocity of a steering wheel or a displacement of a rack shaft.

8. The electric power steering system according to claim 1, wherein when the magnitude of the corresponding rotation angular velocity is higher than the threshold, the estimated induced voltage is calculated.

9. The electric power steering system according to claim 8, wherein the corresponding rotation angular velocity is a steering angular velocity of a steering wheel or a displacement of a rack shaft.

10. The electric power steering system according to claim 1, wherein when the magnitude of the corresponding rotation angular velocity is higher than the threshold and the amount of change in the corresponding rotation angular velocity is smaller than a reference change amount, the estimated induced voltage is calculated.

11. The electric power steering system according to claim 10, wherein the corresponding rotation angular velocity is a steering angular velocity of a steering wheel or a displacement of a rack shaft.

12. The electric power steering system according to claim 1, wherein the corresponding rotation angular velocity is a steering angular velocity of a steering wheel or a displacement of a rack shaft.

13. The electric power steering system according to claim 1, wherein the corresponding rotation angular velocity is a steering angular velocity of a steering wheel or a displacement of a rack shaft.

* * * * *